United States Patent
Yin et al.

(10) Patent No.: US 9,366,848 B2
(45) Date of Patent: Jun. 14, 2016

(54) WAFER-LEVEL LENS SYSTEMS AND METHODS FOR MANUFACTURING THE SAME

(71) Applicant: OmniVision Technologies, Inc., Santa Clara, CA (US)

(72) Inventors: Chuen-Yi Yin, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/323,846

(22) Filed: Jul. 3, 2014

(65) Prior Publication Data

US 2016/0004049 A1    Jan. 7, 2016

(51) Int. Cl.
| | |
|---|---|
| *G02B 13/18* | (2006.01) |
| *G02B 3/08* | (2006.01) |
| *G02B 9/00* | (2006.01) |
| *G02B 13/00* | (2006.01) |
| *G02B 9/12* | (2006.01) |
| *B29D 11/00* | (2006.01) |

(52) U.S. Cl.
CPC ...... *G02B 13/0085* (2013.01); *B29D 11/00307* (2013.01); *G02B 9/12* (2013.01); *G02B 13/006* (2013.01); *G02B 13/0035* (2013.01)

(58) Field of Classification Search
CPC ..... G02B 9/12; G02B 13/0035; G02B 13/006
USPC .......................................... 359/716, 741, 796
See application file for complete search history.

(56) References Cited

U.S. PATENT DOCUMENTS

| | | | | |
|---|---|---|---|---|
| 2010/0315724 | A1* | 12/2010 | Fukuta | G02B 13/0035 359/716 |
| 2011/0013070 | A1* | 1/2011 | Hirao | G02B 7/008 348/340 |
| 2013/0094102 | A1* | 4/2013 | Baba | G02B 13/003 359/784 |
| 2013/0242413 | A1* | 9/2013 | Baba | G02B 9/12 359/753 |

* cited by examiner

*Primary Examiner* — William Choi
(74) *Attorney, Agent, or Firm* — Lathrop & Gage LLP

(57) ABSTRACT

A wafer-level lens system includes one or more wafer-level lenses, each of the one or more wafer-level lenses having a substrate with opposing first and second surfaces, a first lens element of a first material and disposed on the first surface, and a second lens element of a second material and disposed on the second surface, wherein, for at least one of the one or more wafer-level lenses, the first material is different from the second material. Another wafer-level lens system includes three wafer-level lenses optically coupled in series with each other, each of the three wafer-level lenses having a substrate with opposing first and second surfaces, a first lens element disposed on the first surface and having an aspheric surface facing away from the first surface, and a second lens element disposed on the second surface and having an aspheric surface facing away from the second surface.

24 Claims, 10 Drawing Sheets

WAFER-LEVEL LENS SYSTEMS AND METHODS FOR MANUFACTURING THE SAME

BACKGROUND

Camera modules are incorporated in a wide array of devices. Consumer electronics devices such as mobile phones, tablets, and laptops generally include a compact camera module. The majority of such devices are equipped with a lens system composed of plastic lenses in a fixed configuration. Typical camera modules have pixel resolution around 2 megapixels or higher. With such a large number of pixels sharing incident light, the associated lens system must have high light collection efficiency in order to generate a sufficiently bright image. The light collection efficiency may be expressed in terms of the F-number, which is defined as the ratio of the effective focal length (EFFL) of the lens system to the entrance pupil diameter (D), that is, F=EFFL/D. Thus, the F-number is a measure of the portion of light from a scene that is collected and imaged by the lens system. A low F-number is synonymous with a high-collection efficiency. To meet cost constraints and performance demands, many camera modules are composed of three plastic lenses configured to yield a relatively low F-number and acceptable imaging properties. The plastic lenses are mass produced using injection molding technology and assembled, together with an image sensor and electronic circuitry, to form a camera module.

SUMMARY

In an embodiment, a wafer-level lens system for imaging a scene onto an image plane includes one or more wafer-level lenses, each of the one or more wafer-level lenses having (a) a substrate with opposing first and second surfaces, (b) a first lens element of a first material and disposed on the first surface, and (c) a second lens element of a second material and disposed on the second surface, wherein, for at least one of the one or more wafer-level lenses, the first material is different from the second material.

In an embodiment, a wafer-level lens system for imaging a scene onto an image plane includes three wafer-level lenses optically coupled in series with each other, each of the three wafer-level lenses having (a) a substrate with opposing first and second surfaces, (b) a first lens element disposed on the first surface and having an aspheric surface facing away from the first surface, and (c) a second lens element disposed on the second surface and having an aspheric surface facing away from the second surface.

In an embodiment, a wafer-level method for manufacturing a wafer-level lens system includes forming a lens wafer by (a) disposing a plurality of first lens elements of a first material on a first surface of a substrate, and (b) disposing a plurality of second lens elements of a second material on a second surface of the substrate, wherein the second surface is opposite the first surface, the second material is different from the first material, and the plurality of second lens elements is aligned with the plurality of first lens elements.

DETAILED DESCRIPTION OF THE EMBODIMENTS

The present disclosure includes wafer-level lens systems produced, at least in part, using wafer-level manufacturing methods. Wafer-level manufacturing is inexpensive and allows for lens design improvements that are not possible to realize with conventional injection molded lenses. Particularly, in the wafer-level lens systems and associated manufacturing methods disclosed herein, the two surfaces of a wafer-level lens are formed on opposing sides of a carrier substrate. Consequently, each lens may be composed of two or three different materials, thus providing additional degrees of freedom for optimizing performance of the lens system, as compared to injection molded lenses and other conventional lenses. Furthermore, the presently disclosed wafer-level lens systems may be formed using materials compatible with reflow soldering. This simplifies the manufacturing of camera modules that include the wafer-level lens systems.

Figure 1:
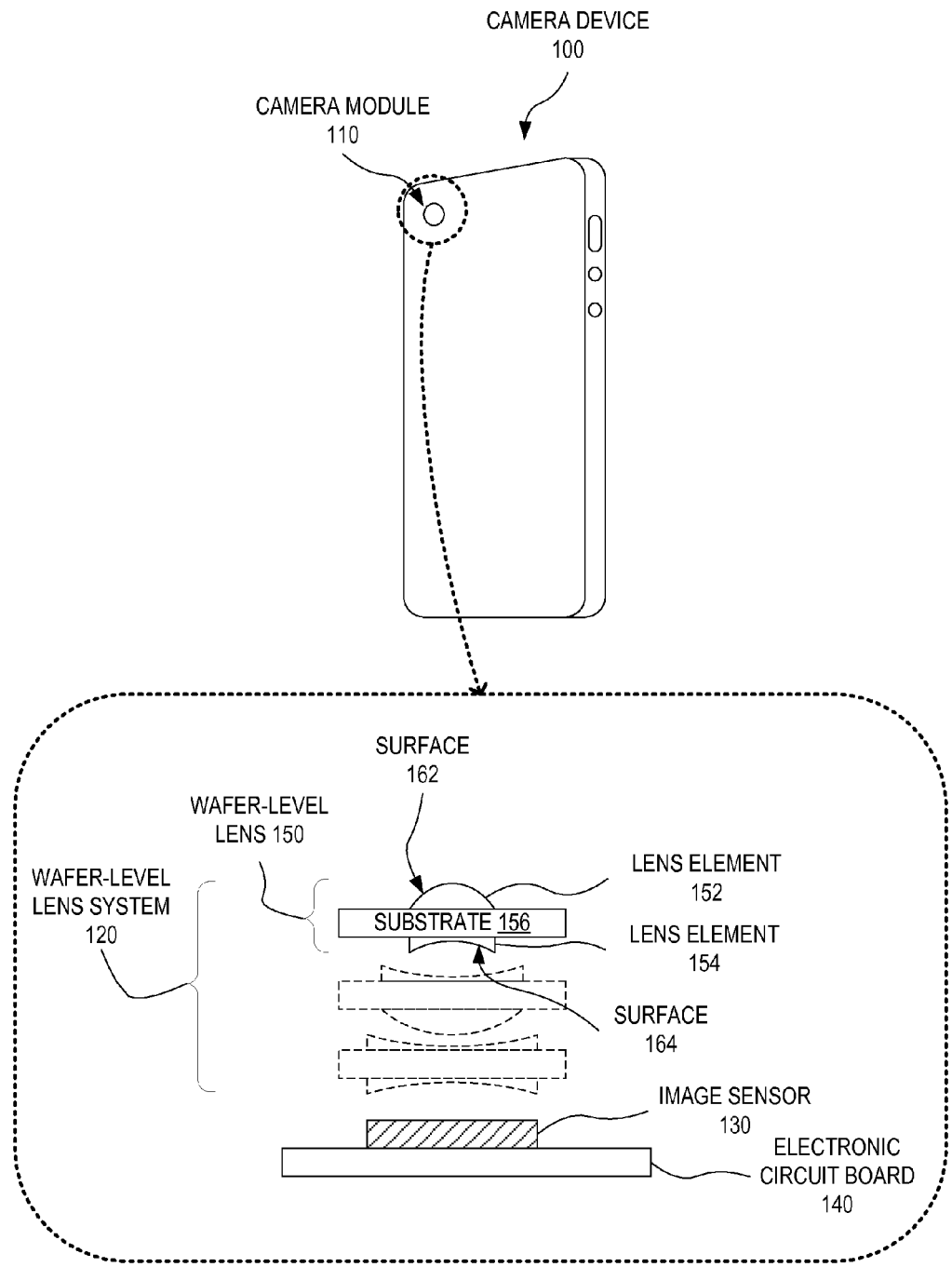
FIG. 1 illustrates a camera module which is incorporated into a camera device and includes at least one wafer-level lens, according to an embodiment.

FIG. 1 illustrates one exemplary camera module 110 which is incorporated into a camera device 100. Camera device 100 is, for example, a cell phone, a tablet, a music player, a laptop computer, a desktop computer or another electronic device or system. Camera module 110 includes a wafer-level lens system 120, an image sensor 130, and an electronic circuit board 140. Wafer-level lens system 120 images a scene onto image sensor 130. Electronic circuit board 140 facilitates operation, such as image capture and image readout, of image sensor 130. Wafer-level lens system 120 includes at least one wafer-level lens 150.

Wafer-level lens 150 includes two lens elements 152 and 154 disposed on opposing sides of a substrate 156. Lens element 152 and 154 include respective surfaces 162 and 164 facing away from substrate 156. Surfaces 162 and 164, together with materials disposed between surfaces 162 and 164, form a single lens. However, compared to a conventional single lens, which is composed of the same material throughout, lens element 152, lens element 154, and substrate 156 may be composed of different respective materials. Thus, wafer-level lens 150 provides additional degrees of freedom in the lens design, as compared to, for example, a conventional injection molded lens which is necessarily composed of the same material throughout. In one embodiment, wafer-level lens elements 152 and 154 are composed of different respective materials to improve a performance aspect of wafer-level lens system 120. For example, the materials of wafer-level lens elements 152 and 154 minimize an optical aberration, such as chromatic aberration, spherical aberration, distortion, or field curvature, in certain embodiments. This may result in performance of wafer-level lens system 120 that is improved over what is achievable using conventional injection molded lenses.

The shapes of lens elements 152 and 154 depicted in FIG. 1 are exemplary, and actual shapes of lens elements 152 and 154 may be different, without departing from the scope hereof. For example, lens surface 162, shown in FIG. 1 as being convex, may be concave, a combination of convex and concave, and/or have aspheric properties different from what is illustrated in FIG. 1.

Wafer-level lens 150 is manufactured using wafer-level technology. A plurality of lens elements 152 and a respective plurality of lens elements 154 are formed on opposing sides of a substrate wafer, which is subsequently diced to produce individual wafer-level lenses 150. Since lens element 152, lens element 154, and substrate 156 are independently formed, these elements may be composed of different materials, as discussed above. Additionally, wafer-level manufacturing is well-suited for mass production and is generally associated with reduced manufacturing cost, as compared to non-wafer-level manufacturing methods.

In some embodiments, camera module 110 is manufactured using reflow soldering to form at least some of the electrical contacts associated with image sensor 130 and electronic circuit board 140. For example, electrical contacts between image sensor 130 and electronic circuit board 140 are formed using reflow soldering after assembling wafer-level lens system 120 with image sensor 130. It is advantageous to assemble wafer-level lens system 120 with image sensor 130 prior to assembling image sensor 130 with electronic circuit board. Not only may this order of assembly simplify the alignment of wafer-level lens system 120 with image sensor 130, optical modules including wafer-level lens system 120 and image sensor 130 may be mass-produced and subsequently incorporated in a variety of camera modules having different properties of electronic circuit board 140.

In reflow soldering of an assembly, permanent electrical connections are formed by heating the assembly to melt solder paste disposed at contact interfaces of the assembly. Typically, the assembly is heated to about 250 degrees Celsius for about 10 seconds to form the permanent electrical connections. Therefore, in some embodiments of wafer-level lens 150, lens element 152, lens element 154, and substrate 156 are composed of materials that are compatible with reflow soldering; each of lens element 152, lens element 154, and substrate 156 is composed of a material that has identical, or substantially identical, optical properties before and after being subjected to a reflow soldering process. For example, each of lens element 152, lens element 154, and substrate 156 is composed of a material that has identical, or substantially identical, optical properties before and after being subjected to 260 degrees Celsius for 10 seconds.

Wafer-level lens system 120 may include any number of wafer-level lenses 150 optically coupled in series, for example, one, two, or three wafer-level lenses 150. For clarity of illustration, only one wafer-level lens 150, and components included therein, are labeled in FIG. 1. As illustrated in FIG. 1, different wafer-level lenses 150 incorporated in wafer-level lens system 120 need not be identical. Generally, different wafer-level lenses 150 incorporated in wafer-level lens system 120 have different properties.

To achieve high optical performance, wafer-level lens system 120 may include aspheric surfaces. In an embodiment, one or more of surfaces 162 and surfaces 164 may be aspheric to reduce an optical aberration. For example, wafer-level lens system 120 includes three wafer-level lenses 150, and therefore three surfaces 162 and three surfaces 164, wherein at least one of the six surfaces 162 and 164 is aspheric.

Figure 2:
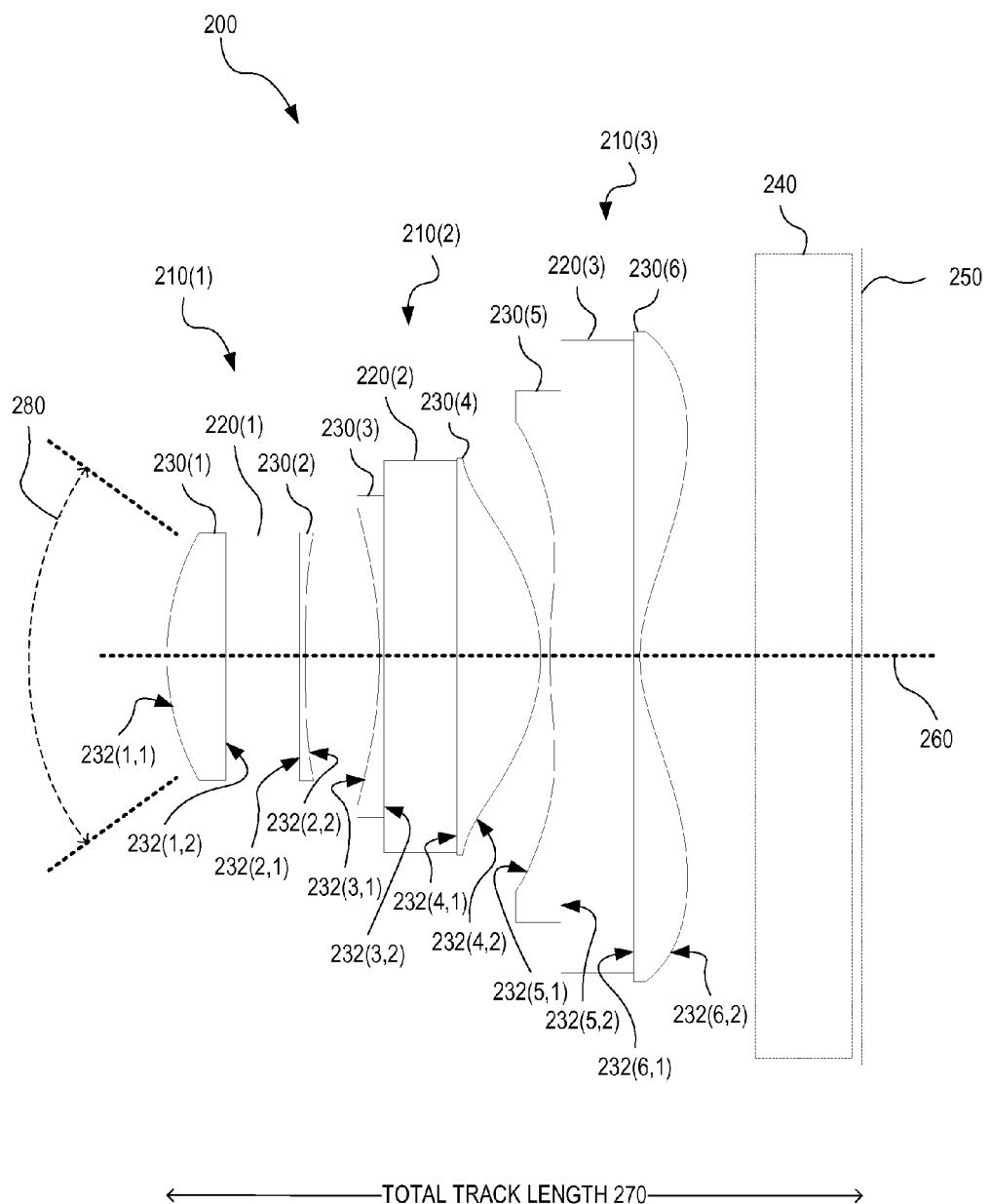
FIG. 2 illustrates a wafer-level lens system that includes three wafer-level lenses optically coupled in series, according to an embodiment.

FIG. 2 illustrates one exemplary wafer-level lens system 200 that includes three wafer-level lenses 210(1), 210(2), and 210(3) optically coupled in series. Wafer-level lens system 200 illustrates, by non-limiting example, the beneficial concepts discussed in connection with FIG. 1. While particular values of parameters for wafer-level lens system 200 are disclosed, actual values may deviate from the disclosed values. A disclosed parameter value is a particular example of a range values and may be extended to such a range of values. Wafer-level lens system 200 is an embodiment of wafer-level lens system 120 (FIG. 1). Wafer-level lenses 210(1), 210(2), and 210(3) are embodiments of wafer-level lens 150 (FIG. 1). Wafer-level lens system 200 includes six aspheric surfaces, may be manufactured using wafer-level technology, and utilizes the additional degrees of freedom, in regards to material choices, facilitated by wafer-level manufacturing. Furthermore, wafer-level lens system 200 is composed of reflow-compatible materials, such as materials that have identical, or substantially identical, optical properties before and after being heated to 260 degrees Celsius for 10 seconds.

Wafer-level lens 210(1) includes two lens elements 230(1) and 230(2) disposed on opposing sides of a planar substrate 220(1). Lens element 230(1) includes an aspheric convex surface 232(1,1), facing away from substrate 220(1), and a planar surface 232(1,2) in contact with substrate 220(1). Likewise, lens element 230(2) includes a planar surface 232(2,1), in contact with substrate 220(1), and an aspheric concave surface 232(2,2) facing away from substrate 220(1). Wafer-level lens 210(2) includes two lens elements 230(3) and 230(4) disposed on opposing sides of a planar substrate 220(2). Lens element 230(3) includes an aspheric concave surface 232(3,1), facing away from substrate 220(2), and a planar surface 232(3,2) in contact with substrate 220(2). Likewise, lens element 230(4) includes a planar surface 232(4,1), in contact with substrate 220(2), and an aspheric convex surface 232(4,2) facing away from substrate 220(2). Wafer-level lens 210(3) includes two lens elements 230(5) and 230(6) disposed on opposing sides of a planar substrate 220(3). Lens element 230(5) includes an aspheric gull-wing shaped surface 232(5,1), facing away from substrate 220(3), and a planar surface 232(5,2) in contact with substrate 220(3). Likewise, lens element 230(6) includes a planar surface 232(6,1), in contact with substrate 220(3), and an aspheric gull-wing shaped surface 232(6,2) facing away from substrate 220(3). Gull-wing shaped surfaces are surfaces that include both convex and concave portions.

Lens elements 230(1), 230(2), 230(3), 230(4), 230(5), and 230(6), and substrates 220(1), 220(2), and 220(3) are composed of reflow-compatible materials.

Wafer-level lens system 200 is configured to image a scene onto an image plane 250 through a cover glass 240. Image plane 250 and cover glass 240 are for example elements of image sensor 130 (FIG. 1). Wafer-level lens system 200 has a total track length (TTL) 270. TTL 270 is the distance from image plane 250, measured along a direction parallel with optical axis 260, to the point of surface 232(1,1) most distant from image plane 250. Wafer-level lens system 200 has a field of view (FOV), schematically indicated by FOV angle 280.

Substrates 220(1), 220(2), and 220(3) may have different diameters than illustrated in FIG. 2, without departing from the scope hereof. For example, substrates 220(1), 220(2), and 220(3) may have diameters sufficiently large that substrates 220(1), 220(2), and 220(3), together with spacers not shown in FIG. 2, form a structure for holding wafer-level lenses 210(1), 210(2), and 210(3). Likewise, lens elements 232(i), i=1, . . . , 6 may have larger diameters than illustrated in FIG. 2, although the optical performance presented below assumes optically active areas as illustrated in FIG. 2.

Tables 1A and 1B lists the lens data of wafer-level lens system 200. The lens data includes values of design parameters all surfaces 232(i,j), lens elements 230(i), and substrates 220(k), where i=1, . . . , 6, j=1, 2, and k=1, 2, 3. The lens data also includes the aperture stop (STO) location, a gap between cover glass (CG) 240 and image plane (IMA) 250. In addition, an assumed object location (OBJ) is listed. Material properties and thicknesses of lens elements 232(i), substrates 220(k), and cover glass are indicated in the same row as the first surface thereof, as viewed from the object side. Thicknesses are indicated in millimeters (mm). For each aspheric surface 232(1,1), 232(2,2), 232(3,1), 232(4,2), 232(5,1), and 232(6,2), the surface profile can be expressed as $$Z(s) = \frac{Cs^1}{1 + \sqrt{1 - (1+k)C^2 s^2}} + A_4 s^4 + A_6 s^6 + \ldots ,$$

Where Z is the surface sag parallel to optical axis 260 as a function of the radial distance s from optical axis 260, C is the inverse of the radius of curvature, k is the conic constant, and $A_4, A_6, \ldots$ are the $4^{th}, 6^{th}, \ldots$ order aspheric terms. The Abbe number is a measure of optical dispersion in a material and is defined as $V_d = (n_D - 1)/(n_F - n_C)$, where $n_D$, $n_F$, and $n_C$ are the indices of refraction at the Fraunhofer D-, F-, and C-lines: $\lambda_D$=589.3 nanometers (nm), $\lambda_F$=486.1 nm, and $\lambda_C$=656.3 nm, respectively.

Wafer-level lens system 200 has an F-number of 2.4, a FOV angle 280 of 72 degrees, TTL 270 of 2.86 mm, and an effective focal length of 2.062 mm. Surface 232(1,2) defines the aperture stop.

TABLE 1A

| Component | Radius of curvature | Thickness | Index of refraction | Abbe number |
|---|---|---|---|---|
| OBJ | Infinity | 400 | | |
| 232(1, 1) | 1.015 | 0.244 | 1.511 | 57 |
| 232(1, 2) | Infinity | 0.000 | | |
| STO | Infinity | 0.000 | | |
| Sub 220(1) | Infinity | 0.300 | 1.517 | 63 |
| 232(2, 1) | Infinity | 0.020 | 1.595 | 30 |
| 232(2, 2) | 5.521 | 0.308 | | |
| 232(3, 1) | −1.880 | 0.020 | 1.595 | 30 |
| 232(3, 2) | Infinity | 0.000 | | |
| Sub 220(2) | Infinity | 0.300 | 1.517 | 63 |
| 232(4, 1) | Infinity | 0.345 | 1.520 | 50 |
| 232(4, 2) | −0.715 | 0.038 | | |
| 232(5, 1) | 1.679 | 0.046 | 1.520 | 50 |
| 232(5, 2) | Infinity | 0.000 | | |
| Sub 220(3) | Infinity | 0.300 | 1.517 | 63 |
| 232(6, 1) | Infinity | 0.026 | 1.520 | 50 |
| 232(6, 2) | 0.597 | 0.476 | | |
| CG 240 | Infinity | 0.400 | 1.517 | 63 |
| Gap | Infinity | 0.040 | | |
| IMA 250 | Infinity | 0.00000 | | |

TABLE 1B

| | Aspheric coefficient | | | | | | |
|---|---|---|---|---|---|---|---|
| Component | Conic constant | $4^{th}$ order term | $6^{th}$ order term | $8^{th}$ order term | $10^{th}$ order term | $12^{th}$ order term | $14^{th}$ order term |
| OBJ | | | | | | | |
| 232(1, 1) | −1.0401 | 0.1107 | 1.2978 | −12.4420 | 56.9838 | −92.4287 | 0.0000 |
| 232(1, 2) | | | | | | | |
| STO | | | | | | | |
| Sub 220(1) | | | | | | | |
| 232(2, 1) | | | | | | | |
| 232(2, 2) | −9.7415 | 0.1749 | −0.9057 | 13.2694 | −56.1152 | 82.5919 | 0.0000 |
| 232(3, 1) | −100.4827 | −1.4587 | 9.7403 | −52.2031 | 180.5617 | −322.0565 | 220.9903 |
| 232(3, 2) | | | | | | | |
| Sub 220(2) | | | | | | | |
| 232(4, 1) | | | | | | | |
| 232(4, 2) | −3.2628 | −0.5035 | 0.6190 | −1.5338 | 5.3121 | −4.2196 | 0.0000 |
| 232(5, 1) | −45.3328 | −0.4151 | −0.8226 | 2.5778 | −2.2566 | 0.5994 | 0.0000 |
| 232(5, 2) | | | | | | | |
| Sub 220(3) | | | | | | | |
| 232(6, 1) | | | | | | | |
| 232(6, 2) | −4.2694 | −0.4152 | 0.3979 | −0.2988 | 0.1338 | −0.0291 | 0.0000 |
| CG 240 | | | | | | | |
| Gap | | | | | | | |
| IMA 250 | | | | | | | |

FIGS. 3A, 3B, 3C, and 3D show the optical performance of wafer-level lens system 200, as evaluated by the Zemax® Optical Design Program. FIGS. 3A, 3B, 3C, and 3D show spherical aberration, f-theta distortion, field curvature, and lateral color, respectively, of wafer-level lens system 200, assuming location of object (OBJ) and image plane (IMA) 250 as indicated in Table 1A. As demonstrated by FIGS. 3A, 3B, 3C, and 3D, wafer-level lens system 200 produces an image on image plane 250 of high optical quality.

Figure 3A:
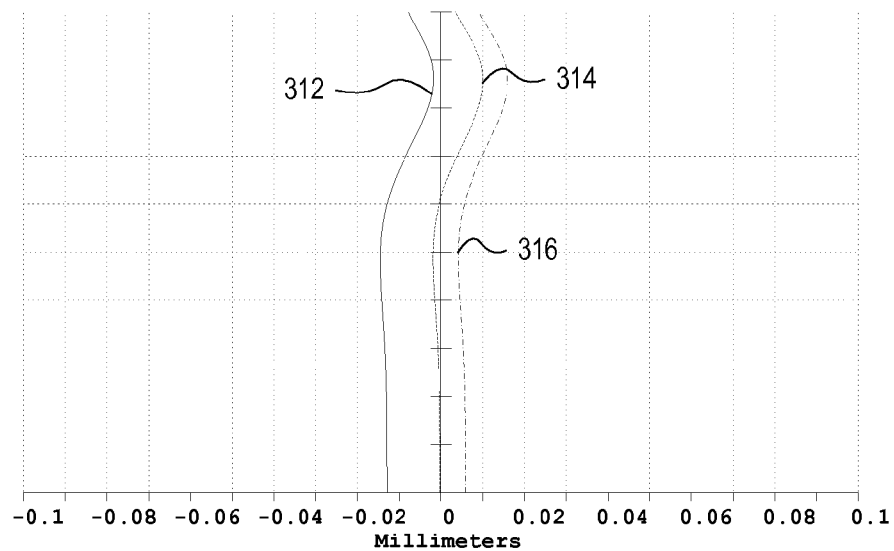
FIG. 3A is a plot of longitudinal spherical aberration of the wafer-level lens system of FIG. 2.

FIG. 3A is a plot of the longitudinal spherical aberration of wafer-level lens system 200. FIG. 3A shows the longitudinal spherical aberration in millimeters, displayed on the horizontal axis, as a function of entrance pupil height, displayed on the vertical axis. The vertical axis extends from optical axis 260 to the most extreme radial distance from optical axis 260 associated with FOV 280. The maximum entrance pupil radius is $r_p$=0.4506 mm. Longitudinal spherical aberration curves 312, 314, and 316 are computed at the Fraunhofer F-, D- and C-spectral lines, respectively.

Figure 3B:
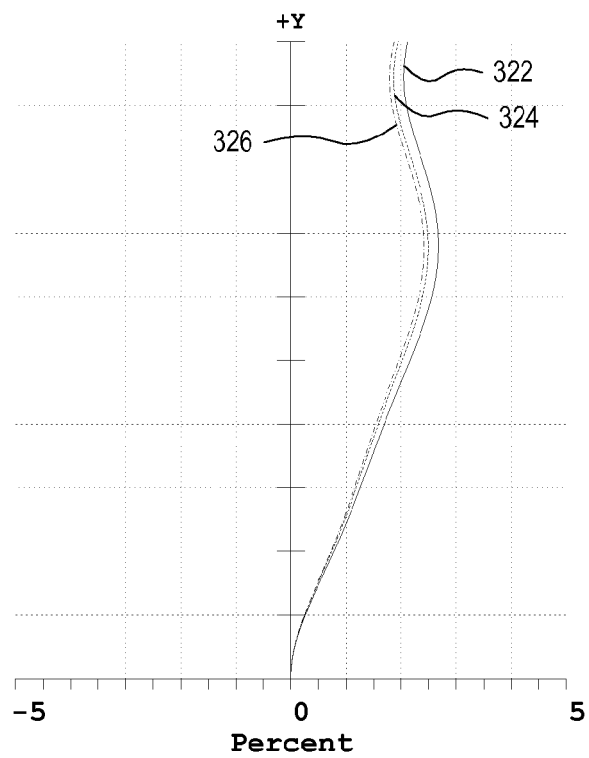
FIG. 3B is a plot of distortion aberration of the wafer-level lens system of FIG. 2.

FIG. 3B is a plot of the f-theta distortion of wafer-level lens system 200. FIG. 3B shows the f-theta distortion in percent, displayed on the horizontal axis, as a function of field angle, displayed on the vertical axis. The vertical axis extends from optical axis 260 to the most extreme location bounded by FOV angle 280. Thus, the maximum field angle plotted in FIG. 3B is $\theta_{max}$=36.094°. Distortion curve 322 (solid line) is computed at wavelength $\lambda_F$, distortion curve 324 (dashed line) is computed at wavelength $\lambda_D$, and distortion curve 326 (dash-dot line) is computed at wavelength $\lambda_F$.

Figure 3C:
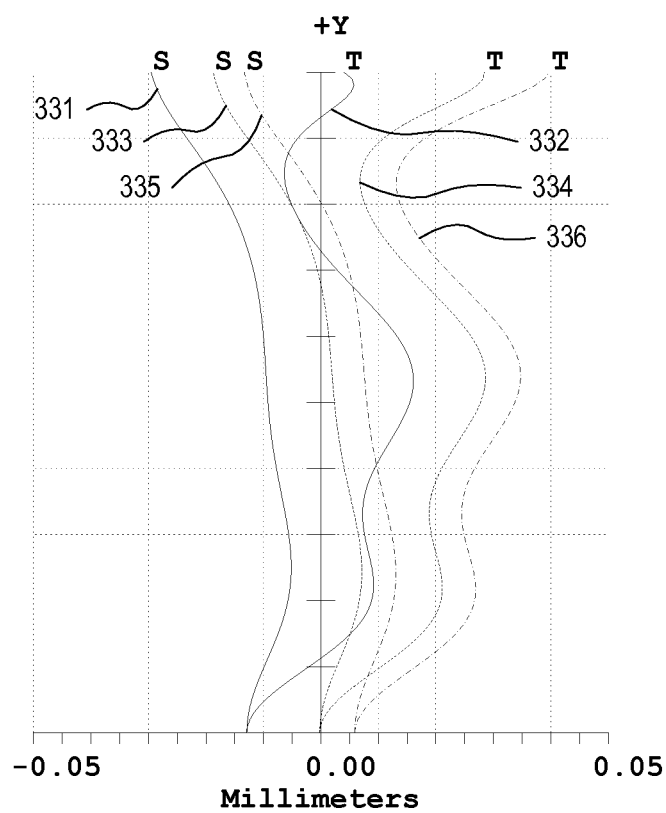
FIG. 3C is a plot of field curvature aberration of the wafer-level lens system of FIG. 2.

FIG. 3C is a plot of the Petzval field curvature of wafer-level lens system 200. The field curvature is plotted in millimeters, displayed on the horizontal axis, for field angles between zero and is $\theta_{max}$=36.094°, displayed on the vertical axis. Field curvature 331 and field curvature 332 are computed at wavelength $\lambda_F$ in the sagittal and tangential planes, respectively. Field curvature 333 and field curvature 334 are computed at wavelength $\lambda_D$ in the sagittal and tangential planes, respectively. Field curvature 335 and field curvature 336 correspond to field curvature at wavelength $\lambda_C$ in the sagittal and tangential planes, respectively.

Figure 3D:
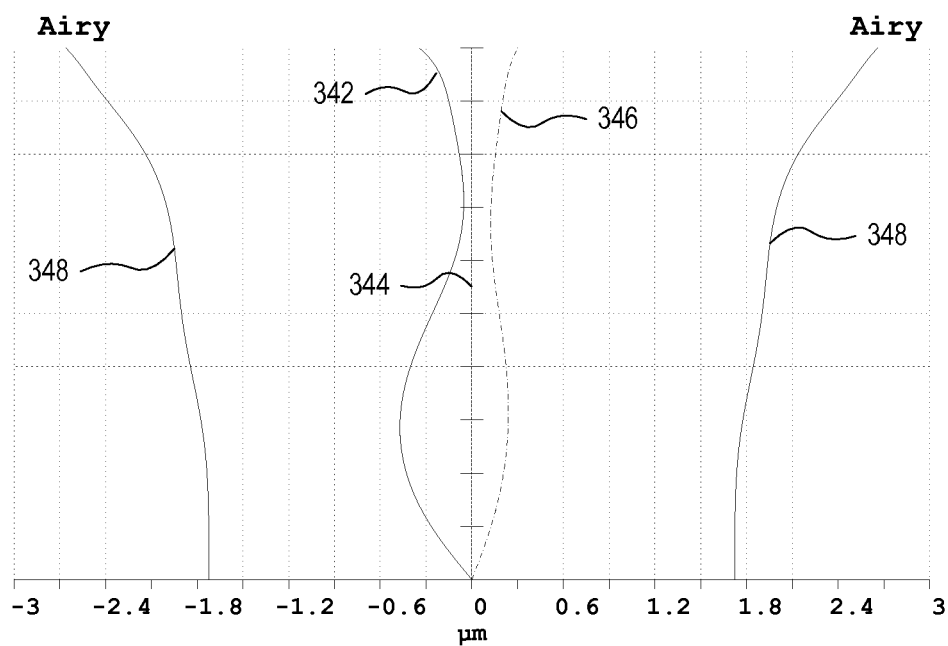
FIG. 3D is a plot of field lateral color aberration of the wafer-level lens system of FIG. 2.

FIG. 3D is a plot of the lateral color error, also known as transverse chromatic aberration, for wafer-level lens system 200. FIG. 3D shows the lateral color error in microns, displayed on the horizontal axis, as a function of field height, displayed on the vertical axis. The vertical axis extends from optical axis 260 to the most extreme radial distance from optical axis 260 associated with FOV 280. Field height ranges from $h_{min}$=0 (on-axis) to $h_{max}$=1.5420 mm. Lateral color is referenced to $\lambda_D$, such that the lateral color 344 for $\lambda_D$ is zero for all field heights. Lateral color 342 is computed at wavelength $\lambda_F$. Lateral color 346 is computed at wavelength $\lambda_C$. The lateral color error is less than the Airy disk radius 348 for the range of field heights evaluated.

Figure 4:
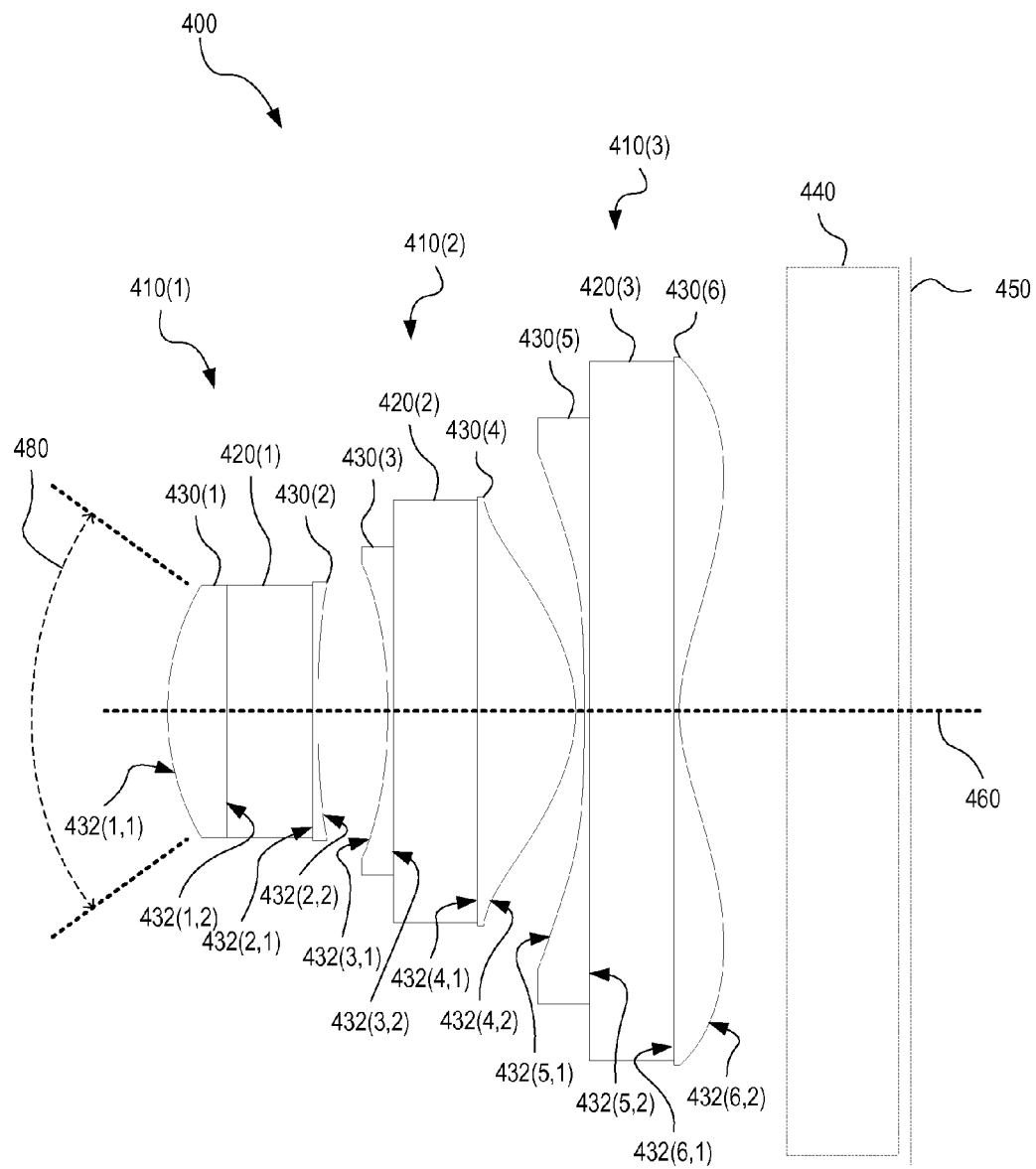
FIG. 4 illustrates another wafer-level lens system that includes three wafer-level lenses optically coupled in series, according to an embodiment.

FIG. 4 illustrates one exemplary wafer-level lens system 400 that includes three wafer-level lenses 410(1), 410(2), and 410(3) optically coupled in series. Wafer-level lens system 400 illustrates, by non-limiting example, the beneficial concepts discussed in connection with FIG. 1. While particular values of parameters for wafer-level lens system 400 are disclosed, actual values may deviate from the disclosed values. A disclosed parameter value is a particular example of a range values and may be extended to such a range of values. Wafer-level lens system 400 is similar to wafer-level lens system 200 (FIG. 2) and is an embodiment of wafer-level lens system 120 (FIG. 1). Wafer-level lenses 410(1), 410(2), and 410(3) are embodiments of wafer-level lens 150 (FIG. 1). Wafer-level lens system 400 includes six aspheric surfaces, may be manufactured using wafer-level lens technology, and utilizes the additional degrees of freedom, in regards to material choices, facilitated by wafer-level manufacturing. In addition, wafer-level lens system 400 is composed of reflow-compatible materials such as materials that have identical, or substantially identical, optical properties before and after being heated to 260 degrees Celsius for 10 seconds.

Wafer-level lens 410(1) includes two lens elements 430(1) and 430(2) disposed on opposing sides of a planar substrate 420(1). Lens element 430(1) includes an aspheric convex surface 432(1,1), facing away from substrate 420(1), and a planar surface 432(1,2) in contact with substrate 420(1). Likewise, lens element 430(2) includes a planar surface 432(2,1), in contact with substrate 420(1), and an aspheric concave surface 432(2,2) facing away from substrate 420(1). Wafer-level lens 410(2) includes two lens elements 430(3) and 430(4) disposed on opposing sides of a planar substrate 420(2). Lens element 430(3) includes an aspheric concave surface 432(3,1), facing away from substrate 420(2), and a planar surface 432(3,2) in contact with substrate 420(2). Likewise, lens element 430(4) includes a planar surface 432(4,1), in contact with substrate 420(2), and an aspheric convex surface 432(4,2) facing away from substrate 420(2). Wafer-level lens 410(3) includes two lens elements 430(5) and 430(6) disposed on opposing sides of a planar substrate 420(3). Lens element 430(5) includes an aspheric surface 432(5,1), facing away from substrate 420(3), and a planar surface 432(5,2) in contact with substrate 420(3). Likewise, lens element 430(6) includes a planar surface 432(6,1), in contact with substrate 420(3), and an aspheric gull-wing shaped surface 432(6,2) facing away from substrate 420(3).

Lens elements 430(1), 430(2), 430(3), 430(4), 430(5), and 430(6), and substrates 420(1), 420(2), and 420(3) are composed of reflow-compatible materials.

Wafer-level lens system 400 is configured to image a scene onto an image plane 450 through a cover glass 440. Image plane 450 and cover glass 440 are for example elements of image sensor 130 (FIG. 1). Wafer-level lens system 400 has a total track length 470. Wafer-level lens system 400 has a field of view, schematically indicated by FOV angle 480.

Substrates 420(1), 420(2), and 420(3) may have different diameters than illustrated in FIG. 4, without departing from the scope hereof. For example, substrates 420(1), 420(2), and 420(3) may have diameters sufficiently large that substrates 420(1), 420(2), and 420(3), together with spacers not shown in FIG. 4, form a structure for holding wafer-level lenses 410(1), 410(2), and 410(3). Likewise, lens elements 432(i), i=1, . . . , 6 may have larger diameters than illustrated in FIG. 4, although the optical performance presented below assumes optically active areas as illustrated in FIG. 4.

Tables 2A and 2B lists the lens data of wafer-level lens system 400, in the same manner as Tables 1A and 1B. Wafer-level lens system 400 has an F-number of 2.4, a FOV angle 480 of 72 degrees, TTL 470 of 2.65 mm, and an effective focal length of 1.902 mm. Surface 432(1,2) defines the aperture stop.

TABLE 2A

| Component | Radius of curvature | Thickness | Index of refraction | Abbe number |
| --- | --- | --- | --- | --- |
| OBJ | Infinity | 400 | | |
| 432(1, 1) | 0.873 | 0.212 | 1.511 | 57 |
| 432(1, 2) | Infinity | 0.000 | | |
| STO | Infinity | 0.000 | | |
| Sub 420(1) | Infinity | 0.300 | 1.517 | 63 |
| 432(2, 1) | Infinity | 0.020 | 1.595 | 30 |
| 432(2, 2) | 4.531 | 0.250 | | |
| 432(3, 1) | −1.793 | 0.020 | 1.595 | 30 |
| 432(3, 2) | Infinity | 0.000 | | |
| Sub 420(2) | Infinity | 0.300 | 1.517 | 63 |
| 432(4, 1) | Infinity | 0.350 | 1.520 | 50 |

TABLE 2A-continued

| Component | Radius of curvature | Thickness | Index of refraction | Abbe number |
|---|---|---|---|---|
| 432(4, 2) | −0.490 | 0.030 | | |
| 432(5, 1) | −15.000 | 0.020 | 1.520 | 50 |
| 432(5, 2) | Infinity | 0.000 | | |
| Sub 420(3) | Infinity | 0.300 | 1.517 | 63 |
| 432(6, 1) | Infinity | 0.020 | 1.520 | 50 |
| 432(6, 2) | 0.586 | 0.383 | | |
| CG 440 | Infinity | 0.400 | 1.517 | 63 |
| Gap | Infinity | 0.040 | | |
| IMA 450 | Infinity | 0.00000 | | |

TABLE 2B

| Component | Aspheric coefficient | | | | | | |
|---|---|---|---|---|---|---|---|
| | Conic constant | $4^{th}$ order term | $6^{th}$ order term | $8^{th}$ order term | $10^{th}$ order term | $12^{th}$ order term | $14^{th}$ order term |
| OBJ | | | | | | | |
| 432(1, 1) | −0.9365 | 0.1608 | 0.9143 | −5.9352 | 30.9975 | −62.9746 | 0.0000 |
| 432(1, 2) | | | | | | | |
| STO | | | | | | | |
| Sub 420(1) | | | | | | | |
| 432(2, 1) | | | | | | | |
| 432(2, 2) | −2.8798 | 0.2217 | −0.8850 | 13.0059 | −59.8018 | 99.1694 | 0.0000 |
| 432(3, 1) | −71.4806 | −1.8068 | 12.2450 | −74.0100 | 274.4615 | −480.4280 | 196.6328 |
| 432(3, 2) | | | | | | | |
| Sub 420(2) | | | | | | | |
| 432(4, 1) | | | | | | | |
| 432(4, 2) | −3.8944 | −0.7278 | 0.9183 | −1.1340 | 6.4505 | −6.6272 | 196.6328 |
| 432(5, 1) | 0.0000 | −0.3916 | −0.6202 | 2.6340 | -206121 | 0.7947 | 0.0000 |
| 432(5, 2) | | | | | | | |
| Sub 420(3) | | | | | | | |
| 432(6, 1) | | | | | | | |
| 432(6, 2) | −6.5687 | −0.3579 | .03852 | −0.3852 | 0.2154 | −0.0521 | 0.0000 |
| CG 440 | | | | | | | |
| Gap | | | | | | | |
| IMA 450 | | | | | | | |

FIGS. 5A, 5B, 5C, and 5D show the optical performance of wafer-level lens system 400, as evaluated by the Zemax® Optical Design Program. FIGS. 5A, 5B, 5C, and 5D show spherical aberration, f-theta distortion, field curvature, and lateral color, respectively, of wafer-level lens system 400, assuming location of object (OBJ) and image plane (IMA) 450 as indicated in Table 2A. As demonstrated by FIGS. 5A, 5B, 5C, and 5D, wafer-level lens system 400 produces an image on image plane 450 of high optical quality.

Figure 5A:
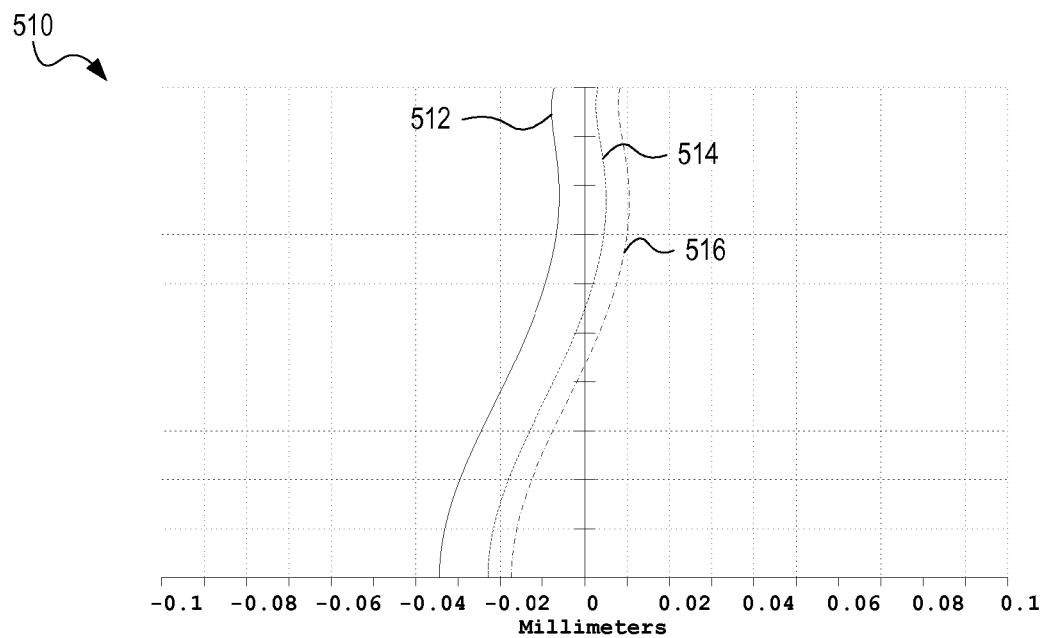
FIG. 5A is a plot of longitudinal spherical aberration of the wafer-level lens system of FIG. 4.

FIG. 5A is a plot of the longitudinal spherical aberration of wafer-level lens system 400. FIG. 5A shows the longitudinal spherical aberration in millimeters, displayed on the horizontal axis, as a function of entrance pupil height, displayed on the vertical axis. The vertical axis extends from optical axis 460 to the most extreme radial distance from optical axis 460 associated with FOV 480. The maximum entrance pupil radius is $r_p$=0.4249 mm. Longitudinal spherical aberration curves 512, 514, and 516 are computed at the Fraunhofer F-, D- and C-spectral lines, respectively.

Figure 5B:
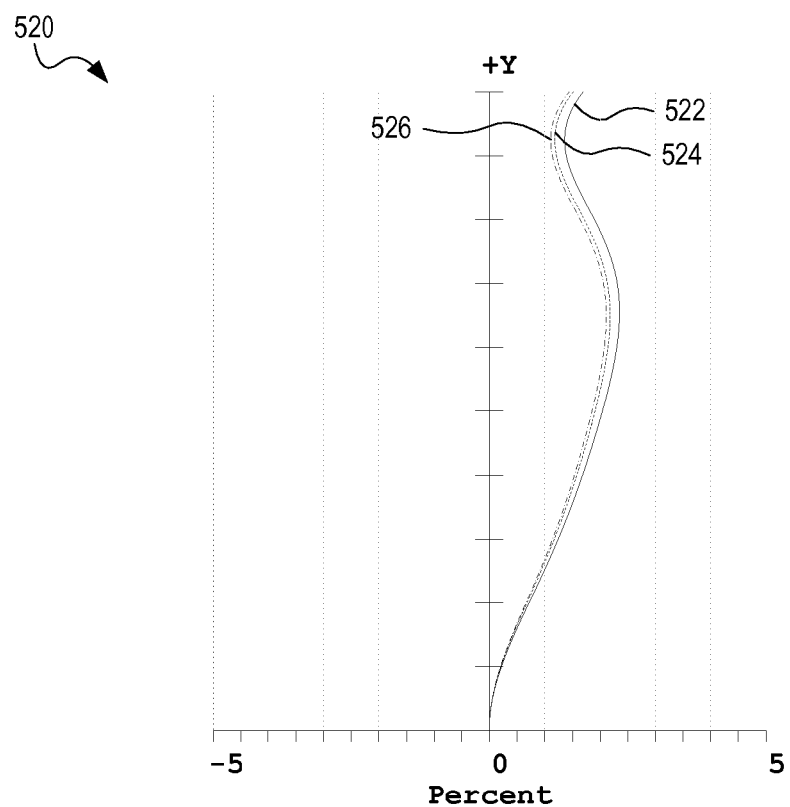
FIG. 5B is a plot of distortion aberration of the wafer-level lens system of FIG. 4.

FIG. 5B is a plot of the f-theta distortion of wafer-level lens system 400. FIG. 5B shows the f-theta distortion in percent, displayed on the horizontal axis, as a function of field angle, displayed on the vertical axis. The vertical axis extends from optical axis 460 to the most extreme location bounded by FOV angle 480. Thus, the maximum field angle plotted in FIG. 5B is $\theta_{max}$=36.852°. Distortion curve 522 (solid line) is computed at wavelength F, distortion curve 524 (dashed line) is computed at wavelength λD, and distortion curve 526 (dash-dot line) is computed at wavelength $\lambda_F$.

Figure 5C:
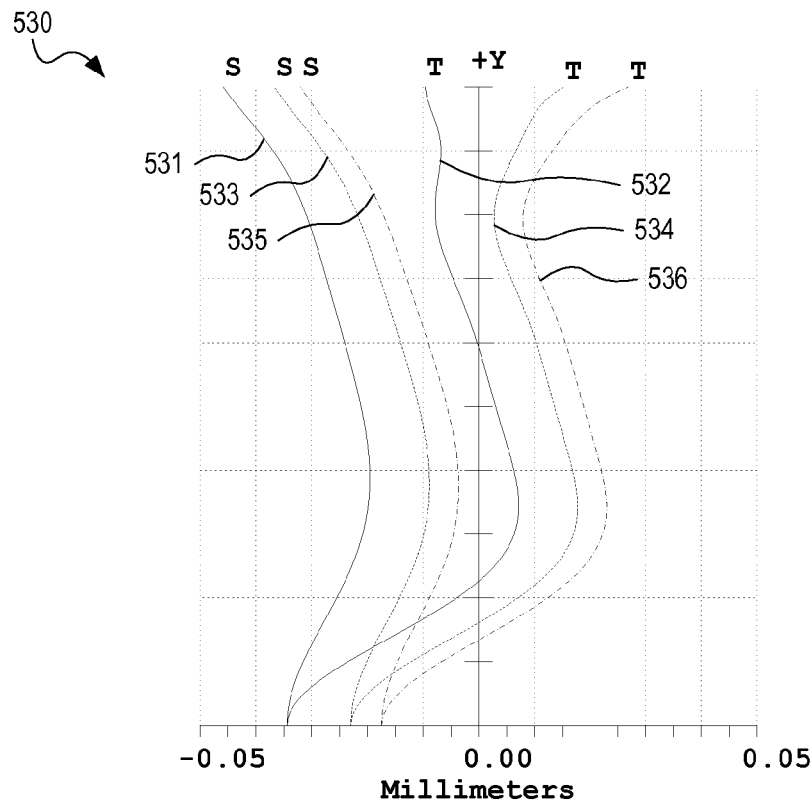
FIG. 5C is a plot of field curvature aberration of the wafer-level lens system of FIG. 4.

FIG. 5C is a plot of the Petzval field curvature of wafer-level lens system 400. The field curvature is plotted in millimeters, displayed on the horizontal axis, for field angles between zero and is $\theta_{max}$=36.852°, displayed on the vertical axis. Field curvature 531 and field curvature 532 are computed at wavelength $\lambda_F$ in the sagittal and tangential planes, respectively. Field curvature 533 and field curvature 534 are computed at wavelength $\lambda_D$ in the sagittal and tangential planes, respectively. Field curvature 535 and field curvature 536 correspond to field curvature at wavelength $\lambda_C$ in the sagittal and tangential planes, respectively.

Figure 5D:
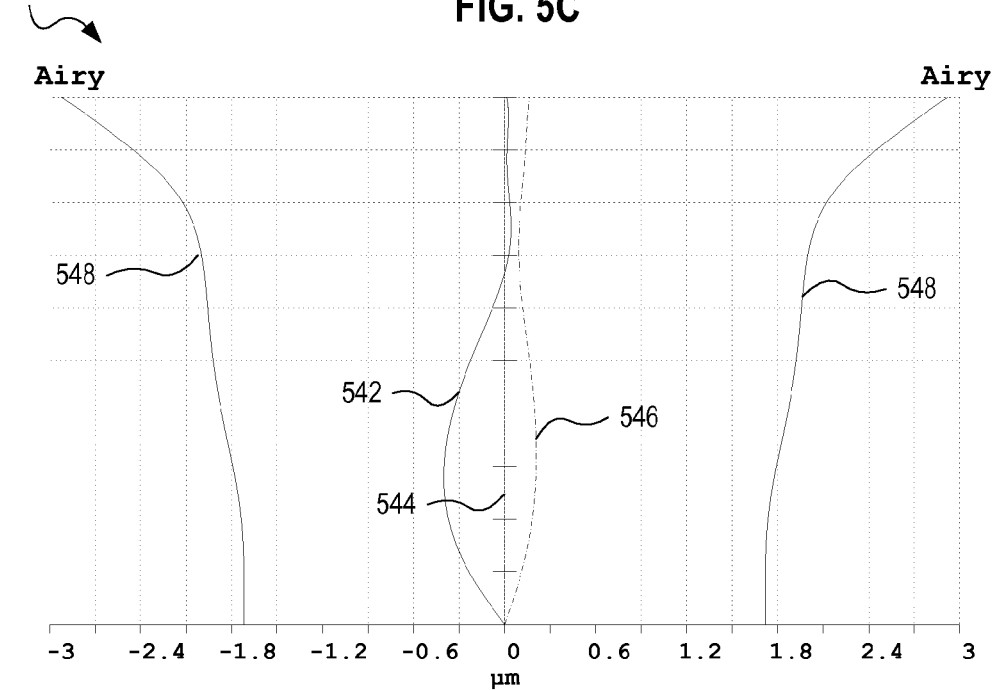
FIG. 5D is a plot of field lateral color aberration of the wafer-level lens system of FIG. 4.

FIG. 5D is a plot of the lateral color error for wafer-level lens system 400. FIG. 5D shows the lateral color error in microns, displayed on the horizontal axis, as a function of field height, displayed on the vertical axis. The vertical axis extends from optical axis 460 to the most extreme radial distance from optical axis 460 associated with FOV 480. Field height ranges from $h_{min}$=0 (on-axis) to $h_{max}$=1.4760 mm. Lateral color is referenced to $\lambda_D$, such that the lateral color 544 for $\lambda_D$ is zero for all field heights. Lateral color 542 is computed at wavelength $\lambda_F$. Lateral color 546 is computed at wavelength $\lambda_C$. The lateral color error is less than the Airy disk radius 548 for the range of field heights evaluated.

Both of wafer-level lens systems 200 (FIG. 2) and 400 (FIG. 4) include wafer-level lenses, wherein the two lens elements are composed of different materials. Lens elements 230(1) and 230(2) of wafer-level lens 210(1) of wafer-level lens system 200 are composed of different materials, as indicated in Table 1A. Also evident from Table 1A, lens elements 230(3) and 230(4) of wafer-level lens 210(2) of wafer-level lens system 200 are composed of different materials. Specifically, lens elements 230(1), 230(2), 230(3), and 230(4) have Abbe numbers 57, 30, 30, and 50, respectively. Likewise, as shown in Table 2A, lens elements 430(1) and 430(2) of wafer-level lens 410(1) of wafer-level lens system 400 are composed of different materials, and lens elements 430(3) and 430(4) of wafer-level lens 410(2) of wafer-level lens system 400 are composed of different materials. Specifically, lens elements 430(1), 430(2), 430(3), and 430(4) have Abbe numbers 57, 30, 30, and 50, respectively.

The use of different materials for lens elements of the wafer-level lens closer to the scene, such as wafer-level lens 230(1) or 430(1), as well as the use of different materials for lens elements of the middle wafer-level lens, such as wafer-level lens 230(2) or 430(2), results in improved chromatic aberration correction, as compared to conventional system based upon lenses composed of the same material throughout. The examples of wafer-level lens systems 200 (FIG. 2) and 400 (FIG. 4) may be extended to a more general embodiments of wafer-level lens system 120 (FIG. 1). Wafer-level lens system 600 images a scene onto an image plane 650, optionally through a cover glass 640. Image plane 650 and cover glass 640 are, for example, elements of image sensor 130 (FIG. 1). Wafer-level lens system 600 is associated with a total track length 670 from image plane 650 to the point of 630(1) most distant from image plane 650, in a direction parallel to an optical axis 660.

Figure 6:
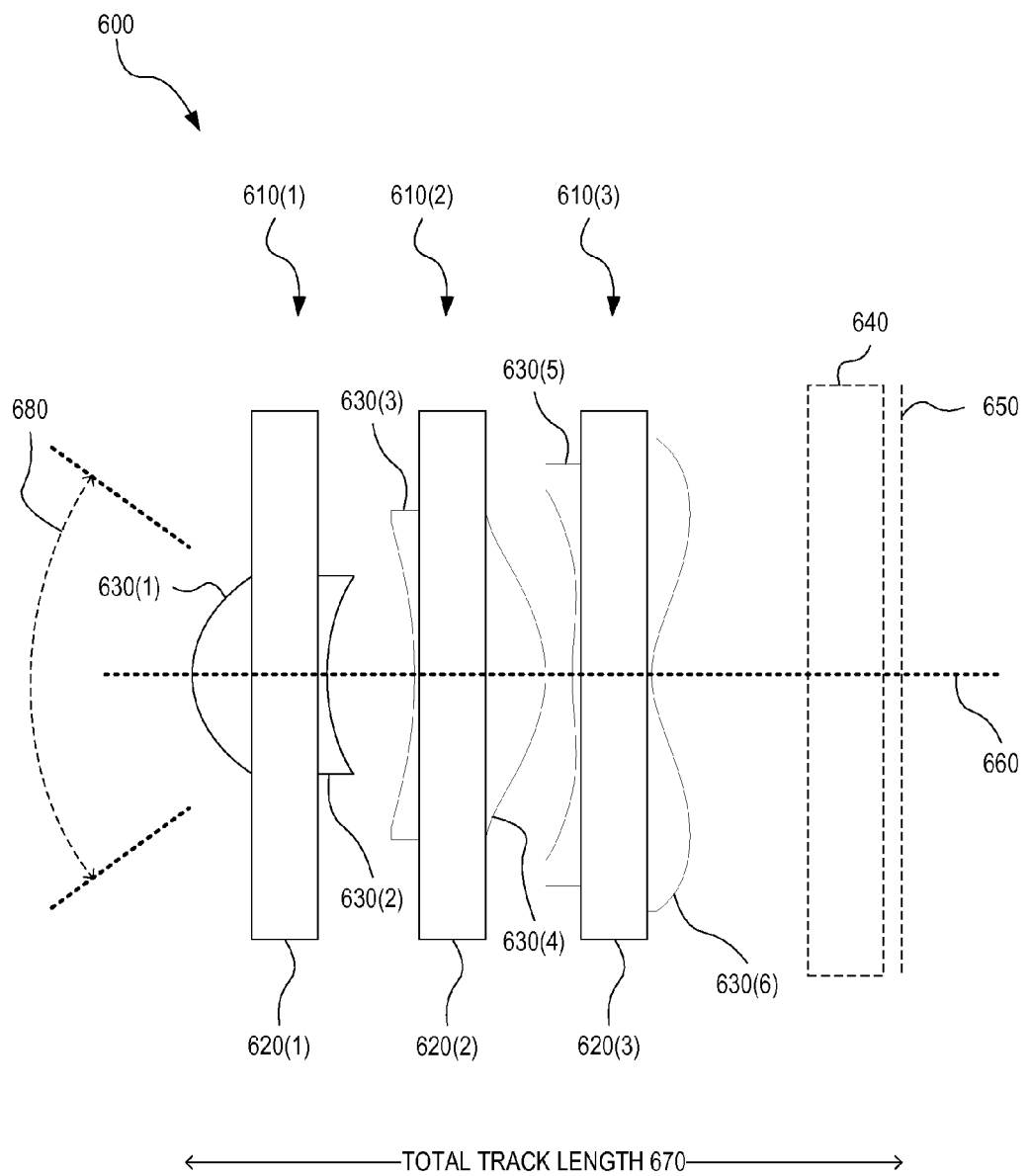
FIG. 6 illustrates a wafer-level lens system that includes three wafer-level lenses optically coupled in series, according to an embodiment.

FIG. 6 illustrates one exemplary wafer-level lens system 600, which includes three wafer-level lenses 610(1), 610(2), and 610(3) optically coupled in series. Wafer-level lens system 600 is an embodiment of wafer-level lens system 120 (FIG. 1), and each of wafer-level lenses 610(1), 610(2), and 610(3) is an embodiment of wafer-level lens 150 (FIG. 1). Wafer-level lens systems 200 (FIG. 2) and 400 (FIG. 4) are examples of wafer-level lens system 600. Similar to the configurations of wafer-level lens systems 200 and 400, wafer-level lens 610(1) includes lens elements 630(1) and 620(2) disposed on opposing sides of a substrate 620(1), wafer-level lens 610(2) includes lens elements 630(3) and 620(4) disposed on opposing sides of a substrate 620(2), and wafer-level lens 610(3) includes lens elements 630(5) and 620(6) disposed on opposing sides of a substrate 620(3).

The shapes of lens elements 630($i$), i=1, . . . , 6 depicted in FIG. 6 are exemplary, and actual shapes of lens elements 630($i$), i=1, . . . , 6 may be different, without departing from the scope hereof. For example, a lens surface shown in FIG. 6 as being convex, may be concave, a combination of convex and concave, and/or have aspheric properties different from what is illustrated in FIG. 6.

In an embodiment, lens element 630(1) is composed of a different material than lens element 630(2). For example, lens elements 630(1) and 630(2) are composed of materials having Abbe number greater than 55 and less than 35, respectively. Furthermore, in combination therewith, lens element 630(3) may be composed of a material characterized by an Abbe number less than 35. These material choices for lens elements 630(1), 620(2), and 630(3) provide improved correction for chromatic aberration, as compared to systems wherein each lens is composed of a single material. Wafer-level lens systems 200 (FIG. 2) and 400 (FIG. 4) are examples of an embodiment of wafer-level lens system 600, in which lens elements 630(1), 620(2), and 630(3) have Abbe numbers greater than 55, less than 35, and less than 35, respectively.

*The Handbook of Plastic Optics* (Wiley-VCH, publisher) lists examples of transparent optical materials with Abbe number greater than 55. These include polymethyl methacrylate (PMMA), and cycloolefin polymers such as APEL™5014DP, TOPAS® 5013, and ZEONEX® 480R. The lens material with Abbe number greater than 55 may be plastic, glass, or any other optical material without deviating from the scope hereof. *The Handbook of Plastic Optics* further lists examples of transparent optical materials with Abbe number less than 35. These include polycarbonate such as PANLITE®, polysulfone such as Udel® P-1700, and optical polyester such as OKP-4. The lens material with Abbe number less than 35 may be plastic, glass, or any optical material without deviating from the scope hereof.

In one embodiment, the ratio of the effective focal length, of wafer-level lens system 600, to total track length 670 is greater than 0.65 and less than 0.75. This condition limits the total track length of an embodiment of wafer-level lens system 600 having a specific FOV angle 680; FOV angle 680 is schematically indicated in FIG. 6 and may have a value different from that shown in FIG. 6. Wafer-level lens systems 200 and 400 of FIGS. 2 and 4, respectively, are examples of such an embodiment.

In another embodiment, the ratio of the effective focal length (EFFL), of wafer-level lens system 600, to the focal length F1 of lens element 630(1) is greater than 0.85 and less than 1.15, that is 0.85<EFFL/F1<1.15. This condition defines a range of FOV angles 680. Wafer-level lens systems 200 and 400 of FIGS. 2 and 4, respectively, are examples of such an embodiment.

In yet another embodiment, the effective focal length (EFFL), of wafer-level lens system 600, and the focal lengths F2 and F3 or lens elements 630(2) and 630(3), respectively, are such that −0.95<EFFL*(F2+F3)/(F2*F3)<−0.75. This condition provides optimal correction for chromatic and spherical aberration of wafer-level lens system 600. Wafer-level lens systems 200 and 400 of FIGS. 2 and 4, respectively, are examples of such an embodiment.

In a further embodiment, the effective focal length (EFFL), of wafer-level lens system 600, and the focal lengths F4 and F5 of lens elements 630(4) and 630(5), respectively, are such that 1.9<EFFL*(F4+F5)/(F4*F5)<2.2. This condition provides optimal correction for astigmatism and distortion aberration of wafer-level lens system 600. Wafer-level lens systems 200 and 400 of FIGS. 2 and 4, respectively, are examples of such an embodiment.

In certain embodiments, wafer-level lenses 610(1), 610(2), and 610(3) are composed of reflow-compatible materials, such as materials that have identical, or substantially identical, optical properties before and after being heated to 260 degrees Celsius for 10 seconds.

In some embodiments, all of lens elements 630(1), 630(2), 630(3), 630(4), 630(5), and 630(6) have aspheric surfaces facing away from the respective substrates on which the lens elements are disposed.

Figure 7:
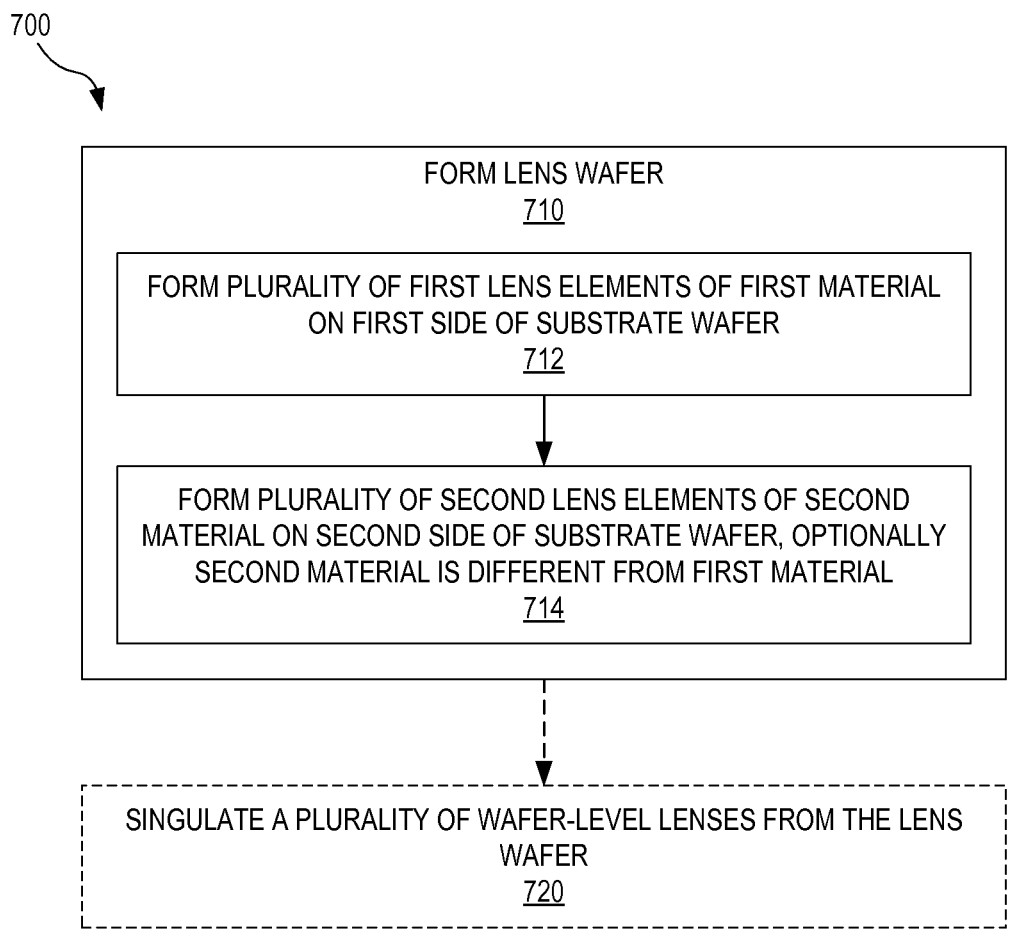
FIG. 7 illustrates a method for manufacturing a lens wafer or a plurality of wafer-level lenses, according to an embodiment.

FIG. 7 illustrates one exemplary wafer-level method 700 for manufacturing a lens wafer, including a plurality of wafer-level lenses such as a plurality of wafer-level lenses 150 (FIG. 1). Optionally, method 700 proceeds to form a plurality of wafer-level lenses. Wafer-level method 700 may be utilized to form an embodiment of wafer-level lens 150, wherein lens elements 152 (FIG. 1) and 154 (FIG. 1) are composed of different materials, and/or wherein one or both of lens elements 152 and 154 include an aspheric surface.

In a step 710, a lens wafer is formed. Step 710 includes steps 712 and 714. In step 712, a plurality of first lens elements of a first material are formed on a first side of a substrate wafer. For example, a plurality of lens elements 152 (FIG. 1) are formed on a first side of a substrate wafer. In this example, substrate 156 (FIG. 1) is produced from a portion of the substrate wafer. The plurality of lens elements 152 may be formed on the substrate wafer using methods known in the art. In one example, a first-type polymer resin is deposited on the first side of the substrate wafer, between the first side of the substrate wafer and a mold. The mold and substrate wafer are brought together to shape a plurality of surfaces 162 (FIG. 1) from the polymer resin, which results in shaping a plurality of lens elements 152. After curing the polymer resin, for example by exposure to ultra-violet light, the mold is separated from the substrate wafer and the polymer. The polymer now forms a plurality of lens elements 152 on the first side of the substrate wafer.

In step 714, a plurality of second lens elements of a second material are formed on a second side of the substrate wafer, wherein the second side is opposite the first side. Optionally, the second material is different from the first material. The plurality of second lens elements are formed on the second side of the substrate wafer in locations that are aligned with the respective locations of the plurality of first lens elements, such that a pair of corresponding first and second lens elements are positioned to form a portion of a single wafer-level lens. The second plurality of lens elements may be formed using the same methods as discussed in connection with the formation of the first plurality of lens elements in step 712, optionally using a different material. In an example, step 714 forms a plurality of lens elements 154 (FIG. 1) on the side of the substrate wafer that is opposite to the side on which lens elements 152 were formed in step 712. The plurality of lens elements 154 are formed in locations that are aligned with respective locations of the plurality of lens elements 152, such that the lens wafer produced in step 710 includes a plurality of wafer-level lenses 150 (FIG. 1).

In an optional step 720, a plurality of wafer-level lenses are singulated from the lens wafer formed in step 710. For example, a lens wafer including a plurality of lens elements 152, disposed on a first side of a substrate wafer, and a respective plurality of lens elements 154, disposed on a second side of a substrate wafer, is diced to form a plurality of wafer-level lenses 150 (FIG. 1).

Figure 8:
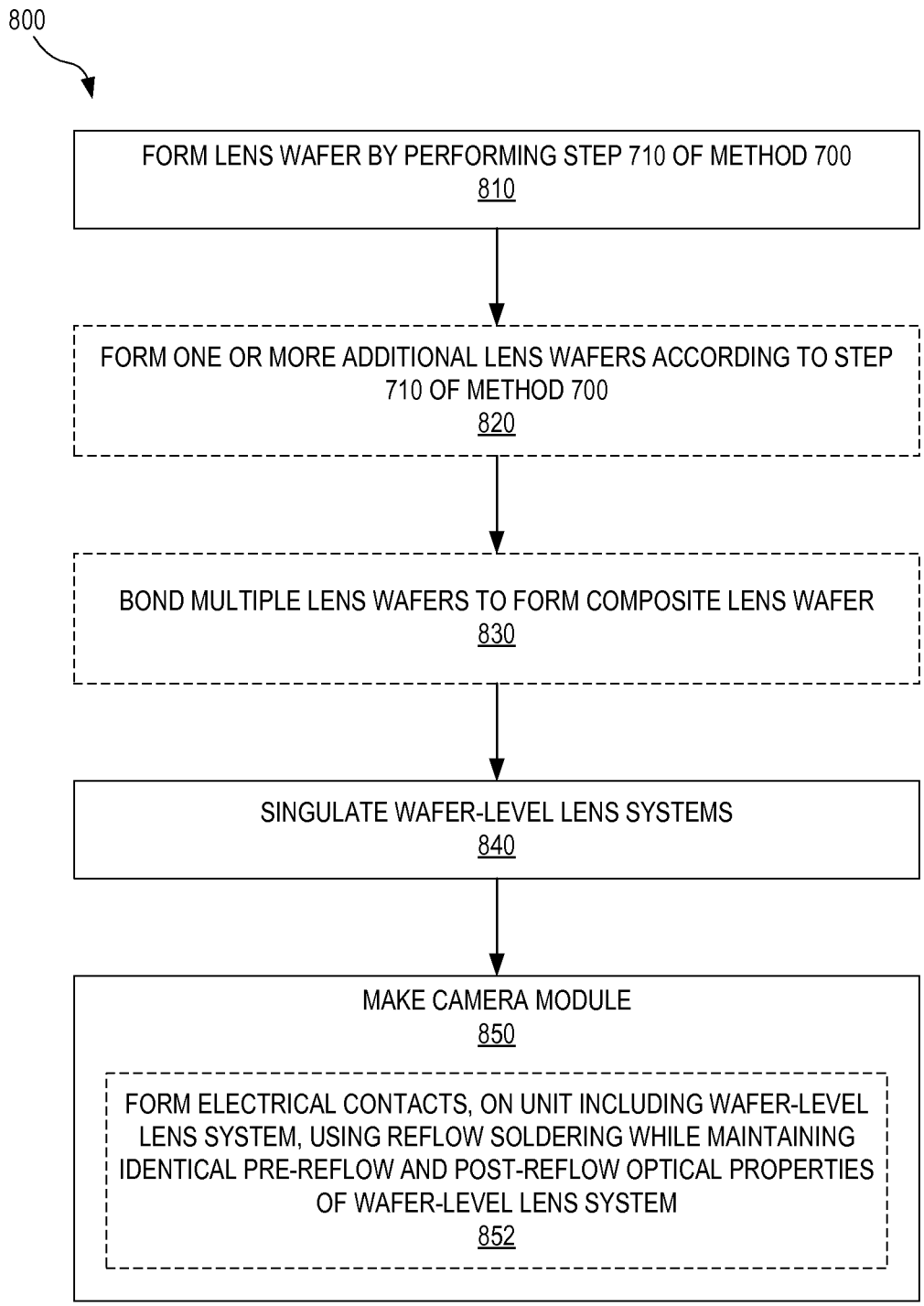
FIG. 8 illustrates a method for manufacturing a camera module that includes at least one wafer-level lens, according to an embodiment.

FIG. 8 illustrates one exemplary method 800 for manufacturing a camera module such as camera module 110 of FIG. 1. In an embodiment, method 800 includes making electrical connections using reflow soldering of a unit that includes a wafer-level lens system, while maintaining identical pre-reflow and post-reflow optical properties of the wafer-level lens system.

In a step 810, a lens wafer is formed by performing step 710 of method 700 (FIG. 7). In an optional step 820, each of one or more additional lens wafers is formed by performing step 710 of method 700. In an optional step 830, which may be included in embodiments of method 800 that include optional step 820, multiple lens wafers are bonded together to form a composite lens wafer. Steps 820 and 830 may be advantageously included in method 800, for forming a wafer-level lens system having multiple wafer-level lenses optically coupled in series, as is the case for wafer-level lens system 200 (FIG. 2), 400 (FIG. 4), 600 (FIG. 6), as well as embodiments of wafer-level lens system 120 (FIG. 1).

In a step 840, individual wafer-level lens systems are singulated from the lens wafer formed in step 810, or from the composite lens wafer formed in step 830. In one example, individual wafer-level lenses 150 (FIG. 1) are singulated from the lens wafer formed in step 810. In another example, individual wafer-level lens systems 600 are singulated from the composite lens wafer formed in step 830. Although not illustrated in FIG. 8, individual wafer-level lenses may be first singulated from a plurality of separate lens wafers, formed by performing step 710 (FIG. 7), and subsequently bonded to form one or more wafer-level lens systems, such as wafer-level lens system 600, without departing from the scope hereof.

In a step 850, a camera module is made by assembling a wafer-level lens or wafer-level lens system, formed in step 840, with an image sensor and an electronic circuit board. For example, wafer-level lens system 120, image sensor 130 (FIG. 1) and electronic circuit board 140 (FIG. 1) are assembled to form camera module 110. In an embodiment, step 850 includes a step 852 of using reflow soldering to make electrical connections in or on a unit that includes the wafer-level lens or wafer-level lens system formed in step 840. In step 852, identical, or at least substantially identical, pre-reflow and post-reflow optical properties of the wafer-level lens or wafer-level lens system are maintained. In embodiments of method 800 that include step 852, the wafer-level lenses or wafer-level lens systems formed in step 840 are composed of materials that are reflow compatible. For example, wafer-level lenses or wafer-level lens systems formed in step 840 are composed of materials that have identical, or substantially identical, optical properties before and after being heated to 260 degrees Celsius for 10 seconds.

Method 800 may be performed without step 850 to manufacture wafer-level lenses or wafer-level lens systems, without departing from the scope hereof.

Combinations of Features

Features described above as well as those claimed below may be combined in various ways without departing from the scope hereof. For example, it will be appreciated that aspects of one wafer-level lens system or method for manufacturing the same described herein may incorporate or swap features of another wafer-level lens system or method for manufacturing the same described herein. The following examples illustrate some possible, non-limiting combinations of embodiments described above. It should be clear that many other changes and modifications may be made to the methods and device herein without departing from the spirit and scope of this invention:

(A1) A wafer-level lens system for imaging a scene onto an image plane may include one or more wafer-level lenses, each wafer-level lens including: (i) a substrate, having opposing first and second surfaces, (ii) a first lens element of a first material and disposed on the first surface, and (iii) a second lens element of a second material and disposed on the second surface.

(A2) In the wafer-level lens system denoted as (A1) the first material may be different from the second material for at least one of the one or more wafer-level lenses.

(A3) In the wafer-level lens systems denoted as (A1) and (A2), the first material may have index of refraction different from that of the second material for at least one of the one or more wafer-level lenses.

(A4) In the wafer-level lens systems denoted as (A1) through (A3), the first material may have Abbe number different from that of the second material for at least one of the one or more wafer-level lenses.

(A5) In the wafer-level lens systems denoted as (A1) through (A4), the one or more wafer-level lenses may define three wafer-level lenses optically coupled in series with each other.

(A6) In the wafer-level lens system denoted as (A5), each of the first and second lens element, in each of the three wafer-level lenses, may have an aspheric surface facing away from the substrate.

(A7) In the wafer-level lens systems denoted as (A1) through (A6), the one or more wafer-level lenses may include a first wafer-level lens located furthest from the image plane, wherein the first lens element and the second lens element of the first wafer-level lens may be composed of different materials.

(A8) The wafer-level lens systems denoted as (A1) through (A7) may have F-number less than 2.5.

(A9) In the wafer-level lens systems denoted as (A1) through (A8), the one or more wafer-level lenses may be composed of reflow compatible materials.

(A10) In the wafer-level lens systems denoted as (A1) through (A9), the one or more wafer-level lenses may be composed of materials that have substantially unchanged optical properties after being heated to at least 250 degrees Celsius for at least 10 seconds.

(B1) A wafer-level lens system for imaging a scene onto an image plane may include three wafer-level lenses optically coupled in series with each other, each of the three wafer-level lenses including: (i) a substrate, having opposing first and second surfaces, (ii) a first lens element disposed on the first surface and having an aspheric surface facing away from the first surface, and (iii) a second lens element disposed on the second surface and having an aspheric surface facing away from the second surface.

(B2) In the wafer-level lens system denoted as (B1), the three wafer-level lenses may include (i) a first wafer-level lens furthest from the image plane, (ii) a second wafer-level lens located between the first wafer-level lens and the image plane, and (iii) a third wafer-level lens located closest to the image plane, wherein the first lens element and the second lens element of the first wafer-level lens may be composed of different materials.

(B3) In the wafer-level lens system denoted as (B2), the first lens element of the first wafer-level lens may have Abbe number greater than 55, the second lens element of the first wafer-level lens may have Abbe number less than 35, and the first lens element of the second wafer-level lens may have Abbe number less than 35.

(B4) In the wafer-level lens systems denoted as (B1) through (B3), the one or more wafer-level lenses may be composed of reflow compatible materials.

(B5) In the wafer-level lens systems denoted as (B1) through (B4), the one or more wafer-level lenses may be composed of materials that have substantially unchanged optical properties after being heated to at least 250 degrees Celsius for at least 10 seconds.

(B6) The wafer-level lens systems denoted as (B1) through (B7) may have an effective focal length EFFL and total track length TTL such that $0.65<EFFL/TTL<0.75$.

(B7) The wafer-level lens systems denoted as (B1) through (B6) may have an effective focal length EFFL, and the three wafer-level lenses may include a first wafer-level lens furthest from the image plane and having focal length F1, such that $0.85<EFFL/F1<1.15$.

(B8) The wafer-level lens systems denoted as (B1) through (B7) may have an effective focal length EFFL, and the three wafer-level lenses may include a first wafer-level lens furthest from the image plane, a second wafer-level lens located between the first wafer-level lens and the image plane, and a third wafer-level lens located closest to the image plane, wherein the second lens element of the first wafer-level lens has focal length F2 and the first lens element of the second wafer-level lens has focal length F3, such that $-0.95<EFFL*(F2+F3)/(F2*F3)<-0.75$.

(B9) The wafer-level lens systems denoted as (B1) through (B8) may have effective focal length EFFL, and the three wafer-level lenses may include a first wafer-level lens furthest from the image plane, a second wafer-level lens located between the first wafer-level lens and the image plane, and a third wafer-level lens located closest to the image plane, wherein the first lens element of the second wafer-level lens has focal length F4 and the second lens element of the third wafer-level lens has focal length F5, such that $1.9<EFFL*(F4+F5)/(F4*F5)<2.2$.

(C1) A wafer-level method for manufacturing a wafer-level lens system may include forming a lens wafer by disposing a plurality of first lens elements of a first material on a first surface of a substrate and disposing a plurality of second lens elements of a second material on a second surface of the substrate, which is opposite the first surface, wherein the plurality of second lens elements is aligned with the plurality of first lens elements.

(C2) In the wafer-level method denoted as (C1), the second material may be different from the first material.

(C3) In the wafer-level methods denoted as (C1) and (C2), the second material may have different Abbe number than the first material.

(C4) The wafer-level methods denoted as (C1) through (C3) may further include singulating at least one wafer-level lens system from the lens wafer, wherein each of the at least one wafer-level lens system includes a first lens element and a second lens element.

(C5) The wafer-level method denoted as (C4) may further include making at least one camera module that includes electronic circuitry and one of the at least one wafer-level lens system.

(C6) In the wafer-level method denoted as (C5), the step of making may include forming electrical contacts, on a unit that includes the one of the at least one wafer-level lens system, using reflow soldering.

(C7) In the wafer-level method denoted as (C6), the step forming electrical contacts may include maintaining identical pre-reflow and post-reflow optical properties of the first lens material, the second lens material, and material of the substrate.

(C8) For each of the wafer-level lens systems denoted as (A1) through (A10) and (B1) through (B9), at least a portion of the wafer-level lens system may be manufactured using one or more of the wafer-level methods denoted as (C1) through (C7).

(C9) For each of the wafer-level lens systems denoted as (A1) through (A10) and (B1) through (B9), at least a portion of a camera module, including the wafer-level lens system, may be manufactured using one or more of the wafer-level methods denoted as (C1) through (C8).

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present system and method, which, as a matter of language, might be said to fall therebetween.

What is claimed is:
1. A wafer-level lens system for imaging a scene onto an image plane, comprising:
three wafer-level lenses optically coupled in series with each other, each of the wafer-level lenses including:
a substrate, having opposing first and second surfaces,
a first lens element of a first material and disposed on the first surface, and
a second lens element of a second material and disposed on the second surface;
wherein, for at least one of the wafer-level lenses, the first material is different from the second material, and wherein the wafer-level lens system has F-number less than 2.5.

2. The wafer-level lens system of claim 1, wherein, for at least one of the wafer-level lenses, the first material has index of refraction different from that of the second material.

3. The wafer-level lens system of claim 2, wherein, for at least one of the wafer-level lenses, the first material has Abbe number different from that of the second material.

4. The wafer-level lens system of claim 1, for each of the three wafer-level lenses, each of the first and second lens element having an aspheric surface facing away from the substrate.

5. The wafer-level lens system of claim 1, the wafer-level lenses comprising a first wafer-level lens located furthest from the image plane, the first lens element and the second lens element of the first wafer-level lens composed of different materials.

6. The wafer-level lens system of claim 1, the wafer-level lenses being composed of reflow compatible materials.

7. The wafer-level lens system of claim 6, the wafer-level lenses being composed of materials that have substantially unchanged optical properties after being heated to at least 250 degrees Celsius for at least 10 seconds.

8. A wafer-level lens system for imaging a scene onto an image plane, comprising:
   three wafer-level lenses optically coupled in series with each other, each of the three wafer-level lenses including:
      a substrate, having opposing first and second surfaces,
      a first lens element disposed on the first surface and having an aspheric surface facing away from the first surface, and
      a second lens element disposed on the second surface and having an aspheric surface facing away from the second surface;
   wherein the three wafer-level lenses include a first wafer-level lens furthest from the image plane, a second wafer-level lens located between the first wafer-level lens and the image plane, and a third wafer-level lens located closest to the image plane, the first lens element and the second lens element of the first wafer-level lens being composed of different materials, the wafer-level lens system having effective focal length EFFL, the first lens element of the first wafer-level lens has focal length F1, and $0.85 < \text{EFFL}/F1 < 1.15$.

9. The wafer-level lens system of claim 8, the first lens element of the first wafer-level lens having Abbe number greater than 55, the second lens element of the first wafer-level lens having Abbe number less than 35, and the first lens element of the second wafer-level lens having Abbe number less than 35.

10. The wafer-level lens system of claim 8, the three wafer-level lenses being composed of reflow compatible materials.

11. The wafer-level lens system of claim 10, the three wafer-level lenses being composed of materials that have substantially unchanged optical properties after being heated to at least 250 degrees Celsius for at least 10 seconds.

12. The wafer-level lens system of claim 8 having total track length TTL such that $0.65 < \text{EFFL}/\text{TTL} < 0.75$.

13. A wafer-level lens system for imaging a scene onto an image plane, comprising:
   three wafer-level lenses optically coupled in series with each other, each of the three wafer-level lenses including:
      a substrate, having opposing first and second surfaces,
      a first lens element disposed on the first surface and having an aspheric surface facing away from the first surface, and
      a second lens element disposed on the second surface and having an aspheric surface facing away from the second surface;
   wherein the three wafer-level lenses include a first wafer-level lens furthest from the image plane, a second wafer-level lens located between the first wafer-level lens and the image plane, and a third wafer-level lens located closest to the image plane, the first lens element and the second lens element of the first wafer-level lens being composed of different materials, the wafer-level lens system having effective focal length EFFL, the second lens element of the first wafer-level lens having focal length F2, the first lens element of the second wafer-level lens having focal length F3, and $-0.95 < \text{EFFL}*(F2+F3)/(F2*F3) < -0.75$.

14. The wafer-level lens system of claim 13, the first lens element of the first wafer-level lens having Abbe number greater than 55, the second lens element of the first wafer-level lens having Abbe number less than 35, and the first lens element of the second wafer-level lens having Abbe number less than 35.

15. The wafer-level lens system of claim 13, the three wafer-level lenses being composed of reflow compatible materials.

16. The wafer-level lens system of claim 15, the three wafer-level lenses being composed of materials that have substantially unchanged optical properties after being heated to at least 250 degrees Celsius for at least 10 seconds.

17. The wafer-level lens system of claim 13 having total track length TTL such that $0.65 < \text{EFFL}/\text{TTL} < 0.75$.

18. A wafer-level lens system for imaging a scene onto an image plane, comprising:
   three wafer-level lenses optically coupled in series with each other, each of the three wafer-level lenses including:
      a substrate, having opposing first and second surfaces,
      a first lens element disposed on the first surface and having an aspheric surface facing away from the first surface, and
      a second lens element disposed on the second surface and having an aspheric surface facing away from the second surface;
   wherein the three wafer-level lenses include a first wafer-level lens furthest from the image plane, a second wafer-level lens located between the first wafer-level lens and the image plane, and a third wafer-level lens located closest to the image plane, the first lens element and the second lens element of the first wafer-level lens being composed of different materials, the wafer-level lens system having effective focal length EFFL, the first lens element of the second wafer-level lens having focal length F4, the second lens element of the third wafer-level lens having focal length F5, and $1.9 < \text{EFFL}*(F4+F5)/(F4*F5) < 2.2$.

19. The wafer-level lens system of claim 18, the first lens element of the first wafer-level lens having Abbe number greater than 55, the second lens element of the first wafer-level lens having Abbe number less than 35, and the first lens element of the second wafer-level lens having Abbe number less than 35.

20. The wafer-level lens system of claim 18, the three wafer-level lenses being composed of reflow compatible materials.

21. The wafer-level lens system of claim 20, the three wafer-level lenses being composed of materials that have substantially unchanged optical properties after being heated to at least 250 degrees Celsius for at least 10 seconds.

22. The wafer-level lens system of claim 18 having total track length TTL such that 0.65<EFFL/TTL<0.75.

23. A wafer-level method for manufacturing a wafer-level lens system, comprising:
 forming a first lens wafer by:
  disposing a plurality of first lens elements of a first material on a first surface of a substrate, and
  disposing a plurality of second lens elements of a second material on a second surface of the substrate, the second surface opposing the first surface, the second material being different from the first material, the plurality of second lens elements being aligned with the plurality of first lens elements;
 forming two additional lens wafers by performing, for each of the additional lens wafers, steps of:
  disposing a plurality of first additional lens elements on a first additional surface of an additional substrate, and
  disposing a plurality of second additional lens elements on a second additional surface of the substrate, the second additional surface opposing the first additional surface, the plurality of second additional lens elements being aligned with the plurality of first additional lens elements;
 bonding together the first lens wafer and the additional lens wafers to form a composite lens wafer;
 singulating at least one wafer-level lens system from the composite lens wafer, each of the at least one wafer-level lens system including one of the first lens elements, a one of the second lens elements, two of the first additional lens elements, and two of the second additional lens elements, each of the at least one wafer-level lens system having F-number less than 2.5; and
 making at least one camera module that includes electronic circuitry and one of the at least one wafer-level lens system, the step of making including forming electrical contacts, on unit that includes the one of the at least one wafer-level lens system, using reflow soldering, and maintaining identical pre-reflow and post-reflow optical properties of the first lens material, the second lens material, and material of the substrate.

24. The wafer-level method of claim 23, the second material having different Abbe number than the first material.

* * * * *